April 10, 1962
SHINICHI MOTOZAKI ET AL
3,029,281
PROCESS FOR PRODUCING GLUTAMIC ACID FROM FERMENTATION BROTH
Filed Sept. 15, 1959
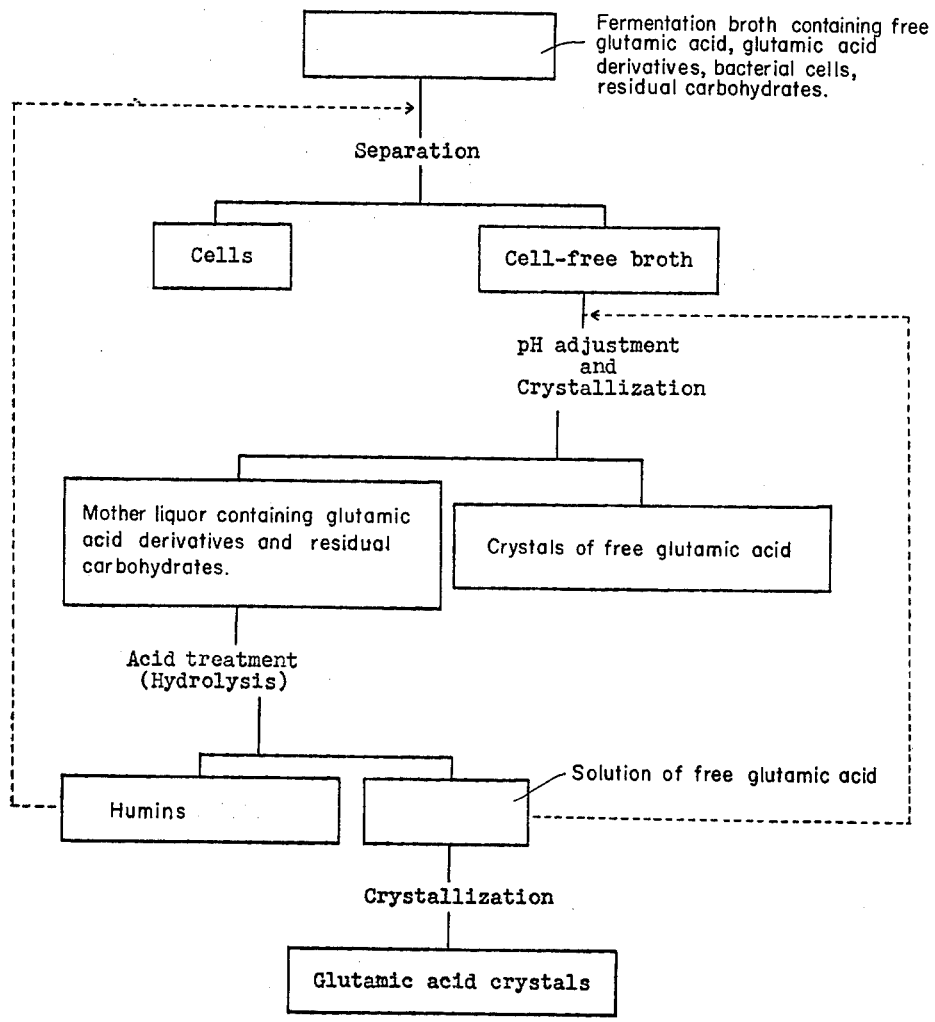
INVENTORS
Shinichi Motozaki
Mei Ohno
Kotaro Fujiwara
BY Kurt Kelman
Their Agent

United States Patent Office 3,029,281
Patented Apr. 10, 1962

3,029,281
PROCESS FOR PRODUCING GLUTAMIC ACID FROM FERMENTATION BROTH
Shinichi Motozaki and Mei Ohno, Tokyo, and Kotaro Fujiwara, Kamakura-shi, Japan, assignors to Ajinomoto Co., Inc., Tokyo, Japan
Filed Sept. 15, 1959, Ser. No. 840,049
Claims priority, application Japan Mar. 18, 1959
4 Claims. (Cl. 260—527)

The present invention relates to a process for producing glutamic acid and especially concerns a process for recovering crystals of glutamic acid or its salts (hereinafter referred to as "free glutamic acid") from a fermentation broth.

It is the main object of this invention to crystallize glutamic acid in well defined crystals, avoiding the formation of poorly defined glutamic acid crystals of relatively small dimensions, to permit ready separation of glutamic acid from glutamic acid fermentation broth.

Another object is to obtain glutamic acid crystals of relatively high purity, free from accompanying cells and other impurities normally contained in the fermentation broth.

A further object is to obtain glutamic acid from the broth simply, with a good yield and at low cost.

Other objects will become apparent from the following specification and claims.

Broths containing glutamic acid obtained by bacterial fermentation, of carbohydrates such as glucose, fructose, sucrose, maltose, starch and the like, always contain cells which are difficult to filter and unfermented residual carbohydrates. Such a broth usually contains 2–8% of cells (wet) and 0.3–3% of the residual carbohydrates besides 3–15% of glutamic acid. The cells act as nuclei of glutamic acid crystallization. They reduce the crystal size and are mixed with the crystallized glutamic acid to the detriment of its purity. The presence of suspended cells should therefore be avoided in the crystallization process. The residual carbohydrates interfere with crystallization and particularly with the growth of crystals. The crystals of glutamic acid formed in the presence of substantial amounts of carbohydrates are of inferior quality and so small that the separation of the crystals from the mother liquor is hardly possible in an industrial operation. Inferior crystal quality and size means, in this specification, crystals of a sifie of needle-, spindle- or platelet shape of less than 10μ or an amorphous glutamic acid precipitate. It is therefore necessary to separate the cells and the residual carbohydrates, form a glutamic acid fermentation broth prior to glutamic acid crystallization.

It has been attempted to separate the cells and the residual carbohydrates from the fermentation broth by adding to the fermentation broth an inorganic acid as a hydrolyzing agent by which the bacterial cells are partly hydrolyzed and the residual carbohydrates are converted to huminous substance hereinafter referred to as "humins." However, this process, consumes a large amount of inorganic acid for the hydrolysis. The glutamic acid fermentation broth is almost neutral and the glutamic acid is usually present as mono-sodium or mono-ammonium glutamate. In order to make such a broth strongly acid, it is necessary to add inorganic acid in an amount equivalent to sodium or ammonium of the glutamates, and further to combine with glutamic acid to form the inorganic acid salt of glutamic acid, for example glutamic acid hydrochloride or hydrosulfate, and furthermore to hydrolyze the cells and convert the residual carbohydrates to humins. In fact, as much as 350 parts of concentrated hydrochloric acid or 300 parts of concentrated sulfuric acid are required based on 100 parts of glutamic acid contained in the broth.

If the cells are separated from the fermentation broth by centrifuging force or filtration with the aid of diatomaceous earth or other suitable materials, the residual carbohydrates are the only substantial obstacle to proper crystallization of glutamic acid from the broth. However, it has been found that the interference with crystallization is not directly related to the absolute concentration of residual carbohydrates, but to the relative concentration, that is, to the ratio of carbohydrates to glutamic acid.

Results of tests of the relation between the ratio of carbohydrates to glutamic acid and the relative velocity of crystal growth are shown in Table 1. The term, "ratio of contamination" refers to the ratio of retained mother liquor to glutamic acid crystallized and separated under standardized conditions. For example, "50" means that the retained mother liquor and the obtained crystals are in a quantitative ratio of 1:2. Many experiments have proved that the magnitude of this ratio is inversely related to crystal quality.

TABLE I

| Ratio of glucose to glutamic acid | 15:100 | 25:100 | 35:100 | 45:100 | 60:100 |
|---|---|---|---|---|---|
| Relative velocity of crystal growth | 110 | 90 | 65 | 50 | 20 |
| Ratio of contamination | 18 | 28 | 35 | 48 | 55 |

We have found that, addition of glutamic acid solution to the fermentation broth after removal of the cells, which decreases the ratio of residual carbohydrates to acid, permits crystallization of the glutamic acid which is present in the free form (the free form includes glutamic acid and its salts while the term "hydrolyzable derivative of glutamic acid" will be employed hereinafter to designate compounds which are not "free" glutamic acid, but can be converted thereto by hydrolysis, such as pyroglutamic acid, glutamin and the like). For this purpose it is necessary to adjust the solution to a pH of 3.0 after separation from the precipitated crystals, the mother liquor is mixed with an inorganic acid and heated to convert the residual carbohydrates into humins which are easily separable from the solution. The filtrate obtained is free from carbohydrates or other interfering substances and contains free glutamic acid produced from glutamin, pyroglutamic acid and like derivatives by hydrolysis and now capable of crystallization to form a well-defined glutamic acid crystals. The last mentioned filtrate may be returned to the process to decrease the ratio of carbohydrates to glutamic acid in the cell-free broth so that the process according to this invention becomes very economical. The free glutamic acid originally present in the broth and the free glutamic acid formed by hydrolysis of its derivatives are crystallized in a single operation. The inorganic acid added in the hydrolyzing step is utilized for the pH adjustment prior to crystallization. In the process according to this invention, the amount of inorganic acid consumed per 100 parts of glutamic acid in the cell-free broth is only 130 parts of concentrated hydrochloric acid or 100 parts of concentrated sulfuric acid which is approximately one-third of the quantity of inorganic acid required in the aforementioned known process.

We have further found that the humins obtained by transformation of residual carbohydrates when added to the fermentation broth before removal of the cells greatly facilitate the filtration of the cells which are otherwise difficult to remove by filtration.

The following Table 2 illustrates the effect of the humins on the filtration of the cells in comparison with diatomaceous earth which is rather expensive but conventionally used in such filtration.

TABLE 2

| Quantity used, percent of broth | Relative quantity of filtrate | | | |
|---|---|---|---|---|
| | after 3 min. | after 5 min. | after 10 min. | after 30 min. |
| 5% (wet) humins | 38 | 48 | 66 | 100 |
| 0.5% (dry) diatom.-earth | 24 | 31 | 41 | 62 |
| 1.0% (dry) diatom.-earth | 28 | 46 | 53 | 80 |
| 2.0% (dry) diatom.-earth | 48 | 57 | 74 | 104 |

The (wet) humins contained approximately 75% water and corresponded to 1.25% (dry) substance.

A process for producing glutamic acid from the fermentation broth according to this invention may be carried out as schematically illustrated in the accompanying drawing.

The humins obtained after hydrolysis are extremely porous and are highly adsorbing. When returned to the process as described above and as indicated by a broken line in the drawing, they not only facilitate filtration of the cells but also permit recovery of a small quantity of absorbed glutamic acid.

When an adequate portion (approximately 50–90%) of the filtrate obtained after hydrolysis is mixed with the cell-free broth before crystallization, the ratio of residual carbohydrates to glutamic acid is diminished to ½–⅓ of the original ratio in the fermentation broth.

The free glutamic acid formed by hydrolysis of derivatives amounts to 10–20% of the quantity of glutamic acid contained in the fermentation broth.

*Example 1*

To 100 parts of a glutamic acid fermentation broth, which contained 5% of total glutamic acid (4% in the free form and 1% in the form derivatives), 4% of cells and 1.6% of residual carbohydrates, 4 parts of diatomaceous earth were added, and the cells were filtered off. The filtrate was gradually mixed with 15 parts of a humin-free liquid obtained after the acid hydrolysis of a previous batch. The liquid contained 3.8 parts of glutamic acid and 3 parts of HCl. The pH of the resulting mixture was adjusted to 3.0. After standing for 2 days at room temperature, it was filtered. 4.3 parts of glutamic acid were recovered in well defined crystals. The purity of the acid was 97% based on the dried crystals.

The mother liquid was concentrated to 18 parts and 6.2 parts of concentrated hydrochloric acid were added. The acid liquor was heated for 3 hours to 110° C. and the humins formed were filtered off.

A major portion of the filtrate was recycled to cell-free broth before the crystallization and the remaining portion was neutralized to induce crystallization.

The total yield amounted to 96% based on the total quantity of glutamic acid contained in the fermentation broth, inclusive of that originally present in the hydrolyzable derivatives. The purity of the compound and the crystal form were excellent.

*Example 2*

To 100 parts of a glutamic acid fermentation broth, which contained 5% glutamic acid, 5% cells and 1% residual sugar, 5 parts of the wet humins which had been separated after the acid hydrolysis from the preceding batch were added, and the cells were filtered off. To the filtrate were gradually added 5 parts of the humin-free filtrate obtained after the acid hydrolysis of the preceding batch. This filtrate contained 1 part of glutamic acid and 1.3 parts of HCl. The pH of the mixture was adjusted to 3.0. After standing for 2 days at room temperature, it was filtered. 4.2 parts of glutamic acid of superior crystal quality were obtained. The purity of the product was 97% based on the dried crystals.

The motor liquor was concentrated to 12 parts and 4 parts of concentrated hydrochloric acid were added. The acid liquor was heated for 3 hours to 110° C. 5 parts (wet) of humins formed and were filtered off.

Most of the filtrate was mixed with a portion of cell free broth before crystallization and the remainder was neutralized and subjected to crystallization.

The total yield amounted to 96% based on the total quantity of glutamic acid contained in the fermentation broth, inclusive of hydrolyzable derivatives. The purity of the compound and the crystal quality were excellent as in the foregoing example.

What we claim is:

1. In a process of recovering crystallized glutamic acid from a fermentation broth including an aqueous solution of free glutamic acid, of hydrolyzable glutamic acid derivatives, and of carbohydrates, and bacterial cells suspended in said solution, the steps of mechanically separating the bacterial cells in a portion of said broth from the liquid remainder of said broth portion; mixing an aqueous free glutamic acid with the cell-free solution obtained by the separation, whereby the ratio of carbohydrates to glutamic acid in the resulting liquid mixture is lower than the ratio in said cell-free solution; adjusting the pH of said mixture to approximately 3.0 and permitting free glutamic acid to crystallize therefrom, leaving a mother liquor; separating the crystallized glutamic acid from said mother liquor; and heating the separated mother liquor in the presence of a strong acid to an elevated temperature for a time sufficient to hydrolyze said glutamic acid derivatives to glutamic acid, whereby said carbohydrates are at least partially converted to humins.

2. In a process as set forth in claim 1, separating said humins from the remainder of the heated mother liquor to obtain a liquid containing dissolved glutamic acid; mechanically separating the bacterial cells in another portion of said broth from the liquid remainder of said broth portion; and adding said liquid to the cell-free liquid broth remainder obtained by the latter separation.

3. In a process as set forth in claim 1, separating said humins from the remainder of said heated mother liquor; adding the separated humins to another portion of said broth; and mechanically separating the bacterial cells in said other broth portion together with said humins from the liquid remainder of said broth portion.

4. In a process as set forth in claim 1, separating said humins from the remainder of said heated mother liquor to obtain a liquid containing dissolved glutamic acid; adding the separated humins to another portion of said broth; mechanically separating the bacterial cells in said other broth portion together with said humins from the liquid remainder of said other broth portion; and adding said liquid to the cell free liquid broth remainder obtained by the latter separation.

References Cited in the file of this patent
UNITED STATES PATENTS
2,929,839    Hoglan _____ Mar. 22, 1960